Patented Dec. 2, 1952

2,620,316

UNITED STATES PATENT OFFICE 2,620,316

SOYA PROTEIN PAPER COATING CONTAINING METHYLATED MELAMINE FORMALDEHYDE RESIN

Daniel D. Ritson, Riverside, Conn., assignor to American Cyanamid Company, New York, N. Y., a corporation of Maine No Drawing. Application August 20, 1949, Serial No. 111,589

4 Claims. (Cl. 260—6)

This invention relates to coating compositions and particularly to pigmented coating compositions useful for coating paper and similar water-laid fibrous products.

Paper and similar water-laid fibrous products such as paper board are frequently coated during or after manufacture with pigmented coating compositions in order to improve the appearance and printing qualities of the product. Most of the coating compositions commonly employed are composed of a mineral pigment, usually clay, and a binder which may be any one or more of several suitable adhesive materials.

It is an object of the present invention to prepare an improved coating composition containing soya protein as the adhesive binder.

It is another object of the present invention to improve the water resistance of a paper coating composition containing soya protein as the binding material.

Another object of the present invention is to provide a method for water-proofing soya protein in coating compositions, particularly in pigmented coating compositions.

A further object of the present invention is the preparation of pigmented coating compositions which will produce on paper and similar water-laid fibrous products a coating of good appearance and high water resistance.

It is a further object of the present invention to increase the water or wet rub resistance of a pigmented paper coating containing soya protein as the binding material without effecting an undesirable increase in the viscosity of the coating composition and without decreasing its stability.

The above and other objects are attained by incorporating a small amount of a water-soluble amino resin such as urea-formaldehyde or melamine-formaldehyde resin in a coating composition containing soya protein, as such or as soya flour or meal. The resin is preferably added to the cooled binding material of the coating composition prior to the addition of pigment in the case of pigmented coatings.

The invention will be described in greater detail in conjunction with the following specific examples in which proportions are given in parts by weight. These examples are merely illustrative and are not included for the purpose of restricting the scope of the invention in any way.

*Example 1*

201 parts English china clay containing 0.5% water
1.0 part 10% aqueous sodium tetraphosphate
33 parts soya protein product containing 88.7% soya protein and 8.5% moisture ("Alpha" protein)
3.9 parts sodium carbonate
0.9 part borax
0.6 part Resin "A," i. e., spray-dried melamine-formaldehyde, F/M=2
282 parts water 132 parts of the water are placed in a stainless steel vessel equipped with a paddle type agitating device. The clay is added, the slurry is mixed for 1¾ hours, the sodium tetraphosphate is added, and stirring is continued for 15 minutes.

The Alpha protein is soaked for 1 hour in 120 parts of the water. The sodium carbonate and borax are dissolved in the remaining 30 parts of water and the alkali solution is added to the soaked protein. This mixture is heated at 140° F. for 1 hour with occasional agitation, then cooled to about 65° F.–75° F., and water is added to replace the water lost during heating. The resin is then added to the protein and the mixture is stirred for about 5 minutes.

The protein adhesive is then added to the pigment dispersion and the mixture thereof is stirred for 1 hour. The coating composition which results is screened through a U. S. Standard 80 mesh screen and is kept agitated until use. It has a pH of 9.1, a viscosity of 272 cps. measured on a Brookfield Viscosimeter at 100 R. P. M., a thixotropic index (which is the ratio of the Brookfield viscosity measured at 10 R. P. M. to that measured at 100 R. P. M.) of 2.1, and a stability index (which is the ratio of the Brookfield viscosity measured at 100 R. P. M. after 24 hrs. ageing to that measured before ageing) of 1.3.

*Example 2*

Example 1 is repeated using 1.2 parts resin in the formulation of the coating color. It has a pH of 8.9, a Brookfield viscosity at 100 R. P. M. of 288 cps., a thixotropic index of 2.2 and a stability index of 5.6.

Example 3

Example 1 is repeated using 0.6 and 1.2 part portions of Resin "B," i. e., a 70% solids urea-formaldehyde resin syrup, F/U=1.9, in place of the spray-dried melamine resin. The pH values of the coating colors are 9.1 and 8.9, the Brookfield viscosities at 100 R. P. M. are 266 cps, and 398 cps., the thixotropic indices are 2.0 and 2.6, and the stability indices are 1.1 and 3.0.

Example 4

Example 1 is repeated using 0.6 and 1.2 part portions of Resin "C," i. e., methylated trimethylol melamine, in place of the spray-dried melamine resin. The coating compositions obtained have pH values of 9.1 and 9.0, Brookfield viscosities at 100 R. P. M. of 266 cps, and 284 cps., thixotropic indices of 2.4 and 2.2, and stability indices of 1.1 and 0.7.

Example 5

201 parts English china clay containing 0.5% water
1.0 part 10% aqueous sodium tetraphosphate
32.6 parts soya protein product containing about 52–53% soya protein and 8% moisture ("Kaysoy No. 6 protein")
0.65 part sodium hydroxide
0.8 part borax
1.2 parts Resin "A," i. e., spray-dried melamine-formaldehyde, F/M=2
280 parts water 132 parts of the water are placed in a vessel as in Example 1, the clay is added, the resulting slurry is agitated for 1¾ hours, the sodium tetraphosphate is added, and agitation is continued for 15 minutes.

The Kaysoy protein is soaked in 120 parts of the water with agitation for about ½ hr. until the mixture is smooth, the sodium hydroxide and borax are dissolved in 26 parts of the water and this alkali solution is added to the soaked protein at 100° F. Agitation is continued for 15 min., the product is cooled, and water is added to replace any water lost. The resin and the remaining 2.8 parts of water are added to the protein, the mixture is stirred for about 5 min. and then added to the pigment dispersion and processed as in Example 1. The coating color obtained has a pH of 9.1, a Brookfield viscosity at 100 R. P. M. of 126 cps., a thixotropic index of 1.1 and a stability index of 1.6.

Example 6

Example 5 is repeated using 1.2 part portions of the urea-formaldehyde resin of Example 3 and the methylated trimethylol melamine of Example 4, respectively. The coating compositions obtained have pH values of 9.0 and 9.0, Brookfield viscosities at 100 R. P. M. of 163 cps. and 130 cps., thixotropic indices of 1.5 and 1.2 and stability indices of 1.2 and 1.1, respectively.

The physical properties of the coating colors of Examples 1–5, inclusive, are summarized in the following table for convenience, together with those of a soya protein coating color containing no resin.

| Protein | Resin Additive | | pH | Brookfield Visc., cps. at 100 R. P. M. | Thix. Index | Stab. Index |
| --- | --- | --- | --- | --- | --- | --- |
|  | Type | Percent on protein | | | | |
| Alpha | | | 9.0 | 330 | 2.7 | |
| | A | 2.0 | 9.1 | 272 | 2.1 | 1.3 |
| | | 4.0 | 8.9 | 238 | 2.2 | 5.6 |
| | B | 2.0 | 9.1 | 266 | 2.0 | 1.1 |
| | | 4.0 | 8.9 | 398 | 2.6 | 3.0 |
| | C | 2.0 | 9.1 | 266 | 2.4 | 1.1 |
| | | 4.0 | 9.0 | 284 | 2.2 | 0.7 |
| Kaysoy #6 | A | 4.0 | 9.1 | 126 | 1.1 | 1.6 |
| | B | 4.0 | 9.0 | 163 | 1.5 | 1.2 |
| | C | 4.0 | 9.0 | 130 | 1.2 | 1.1 |

From the above it will be apparent that resin "C," the methylated trimethylol melamine, is the best modifier of those tested since it, when used in the preferred quantity of 4% by weight, based on the weight of the protein, causes the least increase in viscosity of the paper coating with the best coating color stability. These characteristics are most notable in the instance of the Alpha protein.

Example 7

Each of the 45% solids coating colors of Examples 1–6, inclusive, are used to coat 53 lbs./ream 25 x 38—500 MF coating raw stock on a 0.001" Bird applicator. The coated papers are first air dried and then oven dried at 220° F. for 4 min. Approximately 15 lbs./ream 25 x 38—500 coat weight is applied in each case. The physical properties of the coated papers appear in the table which follows.

| Protein | Resin | | Ingersoll Gloss in Degrees | Dennison A Wax Pick | Wet Rub Resistance.[1] | Brightness, G. E., Percent | Ink Receptivity, K. and N. Percent |
| --- | --- | --- | --- | --- | --- | --- | --- |
|  | Type | Percent on protein | | | | | |
| Alpha | | | 36.9 | 7.5 | 4 | 71.9 | 55.5 |
| | A | 2.0 | 35.7 | 8.0 | 3 | | |
| | | 4.0 | 33.6 | 8.0 | 1½ | | |
| | B | 2.0 | 35.4 | 8.0 | 4 | | |
| | | 4.0 | 33.3 | 7.5 | 2 | | |
| | C | 2.0 | 35.8 | 8.0 | 4 | 71.9 | 55.5 |
| | | 4.0 | 34.3 | 7.5 | 1 | 72.0 | 56.0 |
| Kaysoy #6 | A | 4.0 | 37.2 | 2.0 | 1½ | | |
| | B | 4.0 | 37.7 | 2.0 | 1 | | |
| | C | 4.0 | 38.2 | 2.0 | 2 | | |

[1] Moistened finger rub test: 0=excellent resistance; 7=all coating rubbed off.

From the above it is apparent that coatings containing a quantity of resin according to the present invention retain the desirable physical properties of coatings containing no resin and at the same time acquire an increased initial wet rub resistance. This increase is most marked when 4.0% of the resin based on the protein is used. It is also interesting to note that in the cases of the Kaysoy #6 coatings, the relatively poor wax pick due to the particular protein adhesive used is accompanied, surprisingly, by excellent wet rub resistance.

My invention is in no sense limited to the use of the urea-formaldehyde and melamine-formaldehyde resins of the specific examples and includes all water-soluble amino resins which are characterized by their ability to heat-cure to a water-insoluble condition at moderately low temperatures. Thus I may, in general, use condensation products of an aldehyde such as formaldehyde or a formaldehyde-yielding material such as paraformaldehyde, hexamethylenetetramine and the like, acetaldehyde, benzaldehyde, furfural, etc., with a carbamyl amine such as urea, thiourea, guanidine, dicyandiamide, guanyl urea, biguanide, and the like, or with a triazinylamine such as melamine, ammeline, ammelide, a guanamine, a guanide, etc. The alkylated methylol compositions such as the methylated methylol ureas and methylated methylol melamines are also suitable as are sulfited urea and melamine resins, cationic urea-alkylene polyamine-formaldehyde condensation products, and the like. The resins may be used unpolymerized or in the partially polymerized state. Furthermore, mixtures of two or more of the resins or mixed aldehyde condensation products of two or more of the above amino compounds may also be used. The invention contemplates the use of from about 1–10% by weight of the resin, based on the weight of soya protein in the coating composition.

Other dispersing agents for the pigment than the sodium tetraphosphate of the examples may be used. Suitable dispersing agents include other alkali polyphosphates such as the sodium and potassium polymetaphosphates, disodium dihydrogen pyrophosphate, dipotassium dihydrogen pyrophosphate, tetrapotassium pyrophosphate, potassium tetraphosphate, the polyphosphoric acids, sodium carbonate, sodium silicate, etc. The dispersing agent, of which the alkali metal polyphosphates are the preferred type, are generally used in amounts of from about 0.01% to 2.0% by weight, based on the weight of the pigment.

The mineral pigment ordinarily used in paper coating compositions is a good grade of high-finish coating clay such as the English china clay of the examples. Other grades of domestic or imported coating clay may, of course, be used. Moreover, other pigments such as titanium dioxide, calcium carbonate, satin white, zirconium dioxide, zinc sulfide, lithopone, blanc fixe, etc., either alone or with clay, may also be used in the coating composition as may colored pigments where desired. The amount of pigment, if used, will ordinarily comprise about 50–85% by weight, based on the weight of total solids in the coating composition, but it should be borne in mind that unpigmented coating compositions are also contemplated.

As has been stated above, my invention contemplates the use not only of pure soya protein but also of soya flours or meals which may contain anywhere from about 35% to 55% soya protein in addition to starches and other materials. The coating compositions should contain from about 6% to 25% soya protein, based on the weight of pigment.

The coating compositions of the present invention may contain from about 20–70% total solids although I prefer solutions of about 35–55% solids content. The concentration will, of course, depend on various factors such as the nature of the pigment, the degree of refinement of the soya protein, the dispersing agent, the type of coating apparatus to be used for application of the coating composition, and the like.

The coating compositions generally have a pH of from about 7–10.

Coating compositions of the present invention may be applied to paper stock of various weights suitable for the production of printing and label paper, identification tags, wall paper, insulation and wall board, box board and container board, flour bags, paper for books, magazines, etc., waterproofed decorative gloss paper, etc.

The coating compositions may be applied by any of the known types of coating apparatus using brush, knife, air sheets, rolls, etc. The coating may be dried in the usual way but it is preferred that it be subjected to elevated temperatures for a sufficient time to cure the resin. Accordingly, temperatures up to about 200° C. or higher may be used. Ordinarily a curing time of about 4 minutes at 220° F. is sufficient although a longer time or a high temperature or a longer time at a lower temperature may be used.

It is an advantage of the compositions of the present invention that they may also be used as laminating adhesives for paper and similar water-laid fibrous products.

I claim:

1. An aqueous liquid coating composition which comprises soya protein and about 4% by weight, based on the weight of the soya protein, of a water soluble methylated melamine-formaldehyde which will heat cure at moderately low temperatures to a water insoluble condition.

2. A pigmented paper coating composition having a pH of 7–10 which comprises an aqueous dispersion of 35–55% solids content containing (1) from 50–85% by weight, based on the weight of the total solids, of a mineral pigment, (2) from 0.01%–2% by weight, based on the weight of pigment, of a dispersing agent therefor, (3) from 6–25% by weight, based on the weight of pigment, of soya protein, and (4) about 4% by weight, based on the weight of soya protein, of a water soluble methylated melamine-formaldehyde resin, which will heat cure at moderately low temperature to a water insoluble condition.

3. A water-laid fibrous product coated with the composition of claim 2.

4. Paper coated with the composition of claim 2.

DANIEL D. RITSON.

REFERENCES CITED

The following references are of record in the file of this patent:

UNITED STATES PATENTS

| Number | Name | Date |
|---|---|---|
| 1,877,202 | Satow | Sept. 13, 1932 |
| 2,053,850 | Sturken | Sept. 8, 1936 |
| 2,133,335 | Wilson | Oct. 18, 1938 |
| 2,315,402 | D'Alelio | Mar. 30, 1943 |
| 2,321,933 | Quinn | June 15, 1943 |
| 2,403,465 | Pease | July 9, 1946 |
| 2,453,752 | La Piana et al. | Nov. 16, 1948 |
| 2,469,408 | Powers | May 10, 1949 |

FOREIGN PATENTS

| Number | Country | Date |
|---|---|---|
| 12,021 of 1928 | Australia | Nov. 20, 1928 |
| 480,316 | Great Britain | Feb. 17, 1938 |

OTHER REFERENCES

Mattiello Protective and Decorative Coatings, vol. III, pp. xii, xiii, and 482, Wiley, 1943.